United States Patent [19]

Nolden

[11] 4,181,252
[45] Jan. 1, 1980

[54] THERMOSTATICALLY CONTROLLED MIXING VALVE FOR SANITARY DEVICES

[75] Inventor: Werner Nolden, Wittlich, Fed. Rep. of Germany

[73] Assignee: American Standard Inc., New York, N.Y.

[21] Appl. No.: 906,794

[22] Filed: May 17, 1978

Related U.S. Application Data

[60] Division of Ser. No. 833,931, Sep. 16, 1977, Pat. No. 4,121,761, which is a continuation of Ser. No. 677,574, Apr. 16, 1976, abandoned.

[30] Foreign Application Priority Data

Apr. 19, 1975 [DE] Fed. Rep. of Germany ....... 2517355

[51] Int. Cl.² ............................................. G05D 23/00
[52] U.S. Cl. ................................. 236/12 R; 236/12 A; 137/90
[58] Field of Search ............. 236/12 R, 12 A; 137/90, 137/98

[56] References Cited

U.S. PATENT DOCUMENTS

| | | | |
|---|---|---|---|
| 3,028,094 | 4/1962 | Burhop | 236/12 R |
| 3,388,861 | 6/1968 | Harding | 236/12 R |
| 3,539,099 | 11/1970 | Grohe | 236/12 R |
| 3,584,784 | 6/1971 | Burhop | 236/12 R |
| 3,896,836 | 7/1975 | Labarre | 236/12 R |
| 4,029,256 | 6/1977 | Dauga | 236/12 R |

FOREIGN PATENT DOCUMENTS

| | | | |
|---|---|---|---|
| 1113343 | 8/1961 | Fed. Rep. of Germany | 236/12 A |
| 2355101 | 5/1975 | Fed. Rep. of Germany | 236/12 R |
| 2355100 | 5/1975 | Fed. Rep. of Germany | 137/90 |

*Primary Examiner*—Henry C. Yuen
*Attorney, Agent, or Firm*—James J. Salerno, Jr.; Robert G. Crooks

[57] ABSTRACT

This invention refers to a thermostatically controlled mixing valve for a sanitary installation. The mixing valve is provided with a chamber for mixing the hot and cold water. The mixing chamber has disposed therein, temperature sensing means which automatically adjusts the amount of hot and cold water entering therein to the pre-set temperature and also serves as an outlet which is coupled to a consumption or use point. The mixing valve is provided with either a cartridge which includes valve means for opening and closing the hot and cold water supply with means for proportioning the amount of hot and cold water entering the mixing chamber or a cartridge which includes means for proportioning the amount of hot and cold water entering the mixing chamber with automatic built-in back flow prevention valves for the hot and cold water supply; both cartridges being replaceable or interchangeable respectively within the housing of the mixing valve.

1 Claim, 4 Drawing Figures

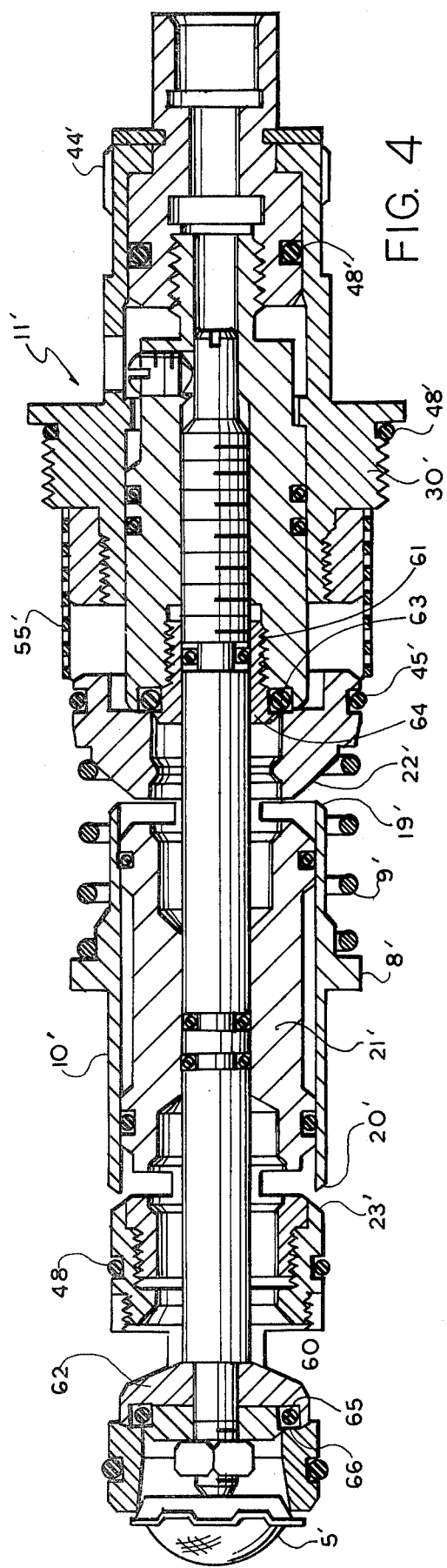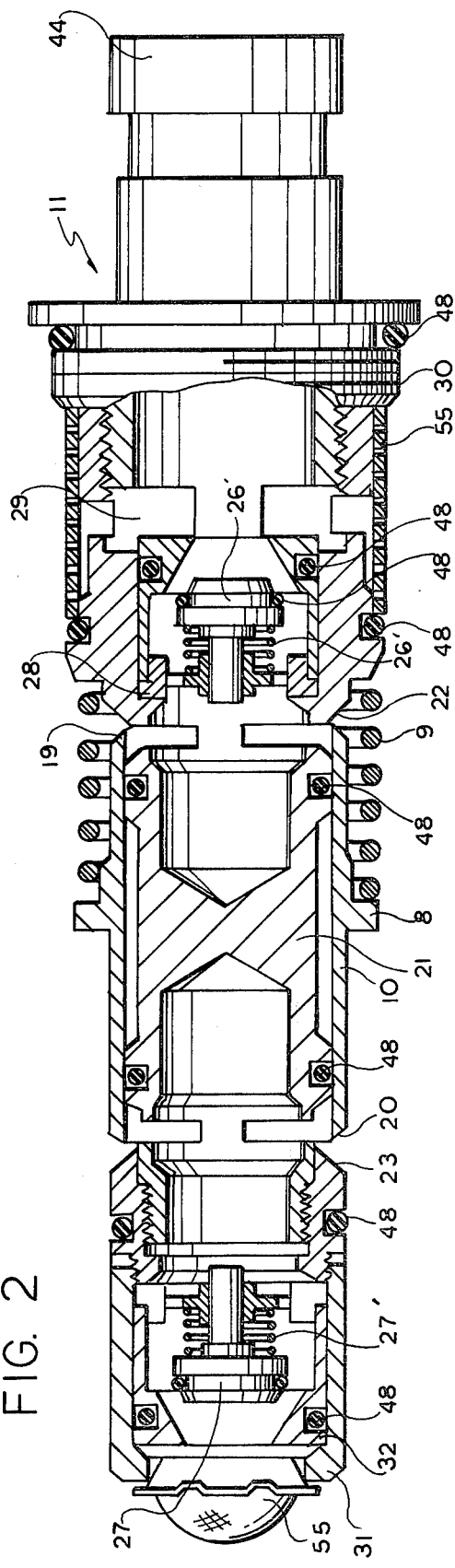

THERMOSTATICALLY CONTROLLED MIXING VALVE FOR SANITARY DEVICES

CROSS REFERENCE TO RELATED APPLICATIONS

This is a division of application Ser. No. 833,931, filed Sept. 16, 1977, now U.S. Pat. No. 4,121,761, which in turn is a continuation of application Ser. No. 677,574, filed Apr. 16, 1976, now abandoned.

BACKGROUND OF THE INVENTION

Two types of thermostatically controlled mixing valves are generally employed in sanitary installations. One type, hereinafter referred to as an individual thermostat, includes a volume regulating assembly which functions as a shut-off valve that opens and closes the hot and cold water supply to the valve and also controls the temperature discharge of the water. The other type, hereinafter referred to as a central thermostat, includes only a temperature regulating mechanism with automatic one way valve means which prevents the back flow of hot and cold water through the potable water system. The valve for opening and closing the temperature regulated water passing through the mixing valve is located at or near a use point. Thermostatically controlled mixing valves of the type described are published in German patent applications No. P 23 55 100.0 published May 15, 1975 and No. P 23 55 101.1 published May 15, 1975.

Individual thermostats differ from central thermostats in that the temperature and volume of the water can be adjusted by a volume control assembly mounted within the valve body whereas in the central thermostat, only the temperature of the water can be adjusted. The desired volume of water passing through a central thermostat is adjusted by means of separate shut-off valves provided at one or more of the use points.

One of the disadvantages of thermostatically controlled mixing valves of either the individual or the central types is that the essential elements of one mixing valve type cannot be combined with the essential elements of the other type. Also, it is not possible, for example, to rebuild a mixing valve of the central thermostat type into mixing valve of the individual type without replacing the entire thermostatically controlled mixing valve.

SUMMARY OF THE INVENTION

One of the prime objects of the present invention is to provide a novel construction for utilizing either the individual or the central type thermostatically controlled mixing valve bodies or housings and convert them to either a central or an individual type mixing valve without the necessity of removing the entire valve assembly and housing from the sanitary installation.

It is another object of the invention to provide a cartridge arranged and constructed having the elements of either an individual or central type mixing valve so that either cartridge may be utilized within the standard valve housing or body of conventional thermostatically controlled mixing valves having a single thermostatic element, for example, a U-shaped bi-metallic element. The cartridges are so designed that their external dimensions are identical to the spaces formed in the housing so that they may be inserted therein by simple threaded engagement.

The invention generally contemplates providing a thermostatically controlled mixing valve adapted for use in sanitary installations. The mixing valve comprises a valve body having hot and cold water inlet openings and an outlet opening. The valve body is formed having a first chamber communicating with the outlet opening and has mounted therein a temperature sensing assembly. A second chamber which communicates with the hot and cold water inlet openings and the outlet opening, is formed in the valve body and is disposed normal to the first chamber. The second chamber is arranged and constructed of a size adapted to receive a cartridge assembly of the type having a temperature and volume control assembly or a temperature controlled assembly only. The temperature sensing assembly is operatively coupled to the temperature control assembly of either type of cartridge so that water entering the first chamber is mixed to a desired pre-set temperature.

BRIEF DESCRIPTION OF THE DRAWING

FIG. 2 is a longitudinal elevational view partly in section of the cartridge assembly of FIG. 1;

FIG. 4 is a longitudinal elevational view of the cartridge assembly of FIG. 3.

DESCRIPTION OF PREFERRED EMBODIMENT

Figure 1:
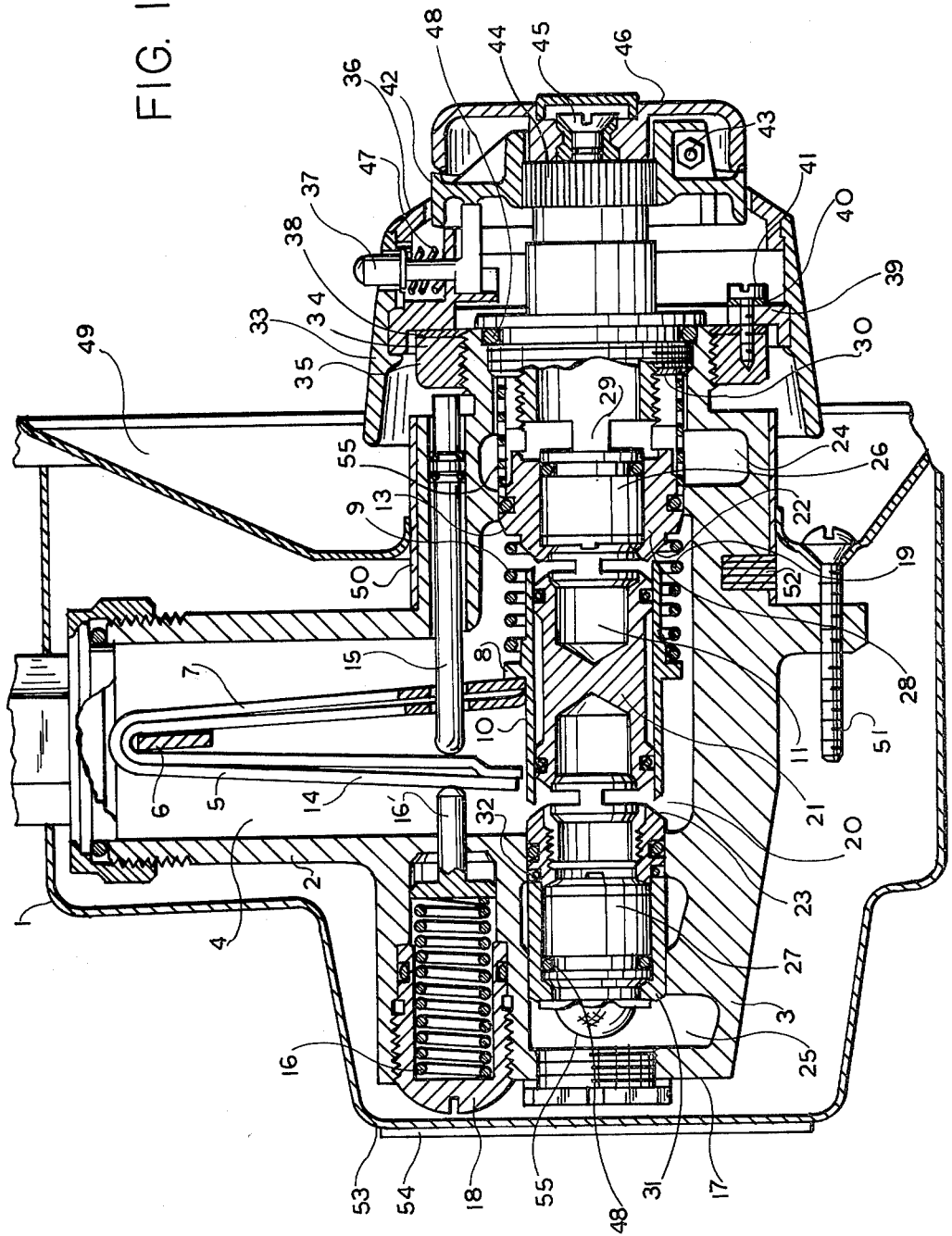
FIG. 1 is a longitudinal elevational view partly in section of one form of a thermostatically controlled mixing valve of the central type.

Referring to FIG. 1 numeral 1 designates a concealed box for accommodating the central thermostat which may be used as a temperature controlling means for a number of outlets for example for both the bath and shower outlets. The housing of the mixing valve or valve body includes elements 2 and 3. Element 2 forms a mixing chamber 4 and at the same time serves as the outlet opening for the temperature controlled water. Element 3 disposed transversely to mixing chamber 4 is dimensioned to receive a regulating mechanism or assembly in the form of a compact unit or cartridge 11 shown most clearly in FIG. 2. It should be noted that element 3 is dimensioned so as to be adapted to receive not only the cartridge 11 of FIG. 2 but also cartridge 11' of FIG. 4 without any modification to the valve body or housing 3.

U-shaped bi-metallic element 5 is disposed in mixing chamber 4 and is part of the temperature sensing assembly that engages the temperature controlling mechanism of cartridge 11. The temperature controlling mechanism includes control sleeve 10 which is slidably mounted on cartridge 11 and moves against the resistance of spring 9. Arm 7 of bimetallic element 5 engages collar 8 formed between the ends of control sleeve 10 so that a change in water temperature will cause the shifting of control sleeve 10 against spring 9. The other arm 14 of bi-metallic element 5 forms a stop for plunger 15 which is movable axially in response to a desired temperature setting. Spring 16 and plunger 16' are mounted in element 2 of the valve body and is displaceable against the movement of plunger 15. It can be seen that by adjusting the temperature setting handle 33 to the desired temperature, plunger 15 will move axially either inwardly or outwardly as the case may be thereby causing control sleeve 10 to shift to and away from the hot and cold water entering openings 25 and 24 respectively of cartridge 11. Plunger 15 passes through an opening formed in arm 7 and is loaded by spring 16 through plunger 16' which is retained in a screw threaded sleeve 18 formed in the rear wall 17 of housing or element 2 of the mixing valve.

Control sleeve 10 through bi-metallic element 5 is adjustable and controls the amount of hot and cold water flowing into mixing chamber 4. When hot water is required, bi-metallic element 5 forces control sleeve 10 toward valve seat 22 so that edge 19 of control sleeve 10 will seat and shut off the cold water flow so that only hot water passes into mixing chamber 4. Conversely when more cold water is required control sleeve 10 moves away from valve seat 22 by the action of bi-metallic element 5 and spring 9 so that end surface 20 of control sleeve 10 will seat on surface 23 of cartridge housing 21.

Cartridge housing 21 contains one-way valves 26 and 27 which are mounted on cartridge 11 at the ends of control sleeve 10 and behind cold water entry opening 24 and hot water entry openings 25. Head member 30 formed at the outer end of cartridge 11 includes collar 28 and projections 29 which mount in place one way valve 26 so that cold water will only flow into cartridge 11. Collar 31 formed at the other end of cartridge 11 and protruding thread ring 32 of cartridge housing 21 mounts hot water one-way valve 27 so that only hot water will flow into cartridge 11. Both one-way valves 26 and 27 are shown most clearly in FIG. 2 and are normally closed by the action of springs 26' and 27' and will only open through water pressure exerted against the inlet side of each valve.

Temperature setting handle 33 is mounted for rotation on cartridge 11 and is preferably made of plastic material. Rated value ring 34 is threadedly mounted on element 3 of the mixing valve and is coupled to temperature setting handle 33. Plunger 15 is spaced parallel to cartridge 11 and is actuated by face 35 of rated value ring 34 and is shiftable axially to and away from arm 14 of bi-metallic element 5 when temperature setting handle 33 is rotated. When rated value ring 34 is rotated clockwise plunger 15 is pressed against arm 14 by camming action of face 35 and shifts plunger 16' to cause the hot water entry opening 25 to be closed by control sleeve 10. Conversely, as rated value ring 34 is rotated counterclockwise, the pressure on plunger 16' is released and causes plunger 15 to shift away from arm 14 so that cold water entry opening 24 will be closed by control sleeve 10. Plastic scale ring 36 having temperature indicia imprinted thereon is mounted on temperature setting handle 33. Temperature scale ring 36 may be fixed in place either by a pressure fit or by welding. Anti-scald means in the form of a limit button 37 is operatively mounted on temperature setting handle 33.

Rated value ring 34 and temperature setting handle 33 are coupled together through interior ring collar 39. Ring collar 39 is welded around its periphery to temperature setting handle 33 and is provided with a plurality of transverse openings 40. This assembly is then coupled to rated value ring 34 by threaded screw 41 through opening 40 as shown in FIG. 1. When the thermostatically controlled mixing valve is ready for use it may be necessary to calibrate the discharge water temperature to correspond to the temperature indicia on temperature setting handle 33. This is accomplished by removing threaded screw 41 and shifting temperature setting handle 33 either clockwise or counterclockwise on rated value ring 34 until the discharge water temperature corresponds to the temperature indicia on handle 33. When this has been completed screw 41 is threaded back into rated value ring 34 through opening 40. In this regard the number of transverse openings 40 formed in interior ring collar 39 do not correspond to the number of threads formed on rated value ring 34. It has been found advantageous to provide three spaced transverse openings 40 in interior ring 39 and to provide a quadruple thread in rated value ring 34. This will permit adequate adjustment of discharge water temperature to correspond with the temperature indicia on the temperature setting handle.

Limit button 37 cooperates with a stop or adjusting ring 42, retained at head member 30 forming one end of the cartridge and which seals the holding space or chamber of element 3 of the mixing valve body. Stop ring 42 is provided with a counter-marking to the temperature scale 36, and is partially or completely slotted to provide ease for mounting on head member 30. Serrations or grooves 44 are formed on head number 30 to obtain a better clamp connection when screw 43 is mounted in adjusting ring 42 as shown in FIG. 1. A terminal cap 46 is held in place by a center screw threaded into head member 30.

Limit button 37 cooperates with stop ring 42 so that an outlet water temperature of 40° C. maximum is provided during normal operation. If a higher outlet water temperature is desired, limit button 37 is depressed to permit temperature setting handle 33 to be turned to the left as viewed in FIG. 1 to a maximum rated value for example, 70° C. Plunger 15 is moved downwardly against thermostat arm 14 which compresses spring 16 and in turn causes the thermostat arm to push upwardly against stop 8 thereby closing the cold water entry valve 26 which permits a greater proportion of hot water to enter mixing chamber 4. When temperature setting handle 33 is turned to the right again toward normal operation, limit button 37 automatically returns to its normal position by means of spring 47. Subsequently when the mixing valve is used again, the temperature setting handle cannot be turned to a temperature setting greater than 40° C. without again depressing limit button 37.

As shown in FIGS. 1 through 4, cartridges 11, 11' have a plurality of O-rings 48 which provide for liquid tight sealing of the different parts of the valve or cartridge. Face or escutcheon plate 49 and slotted terminal sleeve 50 cover the opening in the wall so that a greater esthetic or pleasing external finish is provided. Escutcheon plate 49 contacts the wall, not shown, and is held on mixing valve housing by one or more screws 51. Slotted terminal sleeve 50 can be adjusted for different depths of wall thickness by simply removing part of the sleeve at the slotted or grooved areas. The slotted terminal sleeve 50 is in contact with locking pin 52. The rear wall 53 of box 1 may be constructed so that plaster can be applied thereto particularly where the box may protrude through a narrow partition wall.

Figure 3:
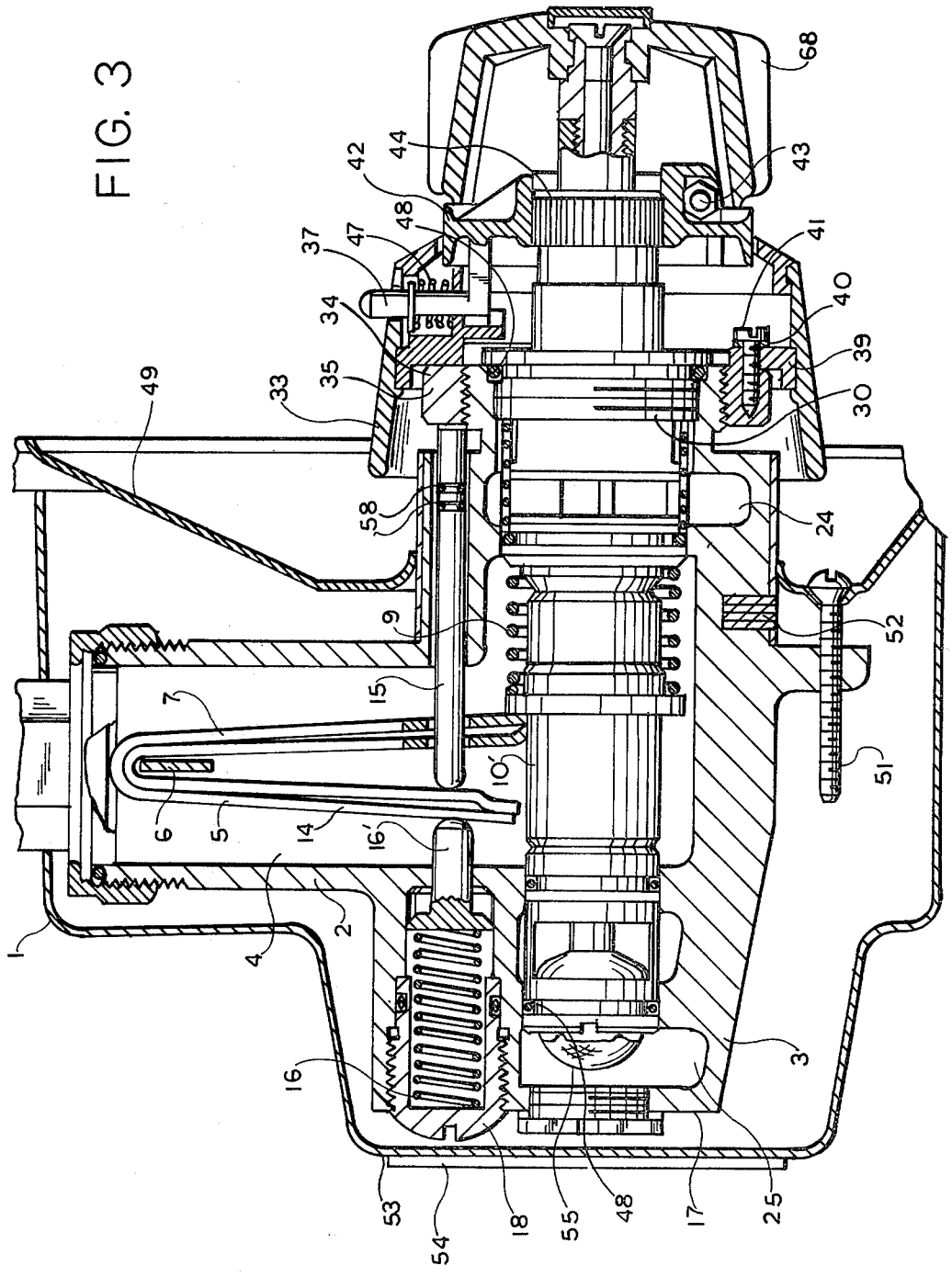
FIG. 3 is another form of thermostatically controlled mixing valve having the identical body of FIG. 1 and cartridge assembly of the individual type.

Referring to the embodiment shown in FIGS. 3 and 4, cartridge 11' has identical external dimensions to that of cartridge 11 so that cartridge 11' can be mounted in liquidtight engagement in the chamber or holding place of element 3 of the mixing valve. Cartridge 11' is arranged and constructed having the same temperature controlling elements of cartridge 11 but does not include one-way valves 26 and 27. Cartridge 11' is utilized for mixing valves of the individual type and includes hot and cold water volume control means. A rotatably mounted axial shaft 60 extends the entire length of cartridge 11' and functions independently to the temperature controlling means of the mixing valve. Shaft 60 has mounted thereon spaced hot and cold water shut-off valves 61 and 62. Mounted on the outer end of the shaft is volume control handle 68 which is used for opening and closing the hot and cold water valves simultaneously. Cold water valve 61 has mounted on its lower face, O-ring 63 which seats against surface 64 of cartridge housing 21'. Hot water valve 62 similarly has resilient O-ring 65 mounted on its lower face which engages surface 66 to form a watertight seal in the closed position as shown in FIG. 4. When cartridge 11' is mounted in valve housing 3, as in FIG. 3, the temperature sensing and actuating mechanisms operate identical to the temperature sensing and actuating mechanism shown in the mixing valve of FIG. 1 since the parts utilized are identical and therefore need not be described in this embodiment. When the thermostatically controlled mixing valve of FIG. 3 is being operated, the volume control handle 68 is turned counterclockwise to open the hot and cold water supply simultaneously. The temperature setting handle is turned to the desired temperature indicia thereon so that the discharge water from chamber 44 will correspond to the temperature indicia on the temperature setting handle 33.

The embodiment of FIGS. 3 and 4 differ from the embodiment of FIGS. 1 and 2 in that the mixing valve of FIGS. 3 and 4 includes hot and cold water shut-off means which acts independently with the temperature sensing and controlling means of the mixing valve. Also this type of mixing valve, of the individual type, does not require one-way valves as back flow preventers since the valve includes hot and cold water shut-off means. In the embodiment of FIGS. 1 and 2, the mixing valve does not provide an independent means for controlling the hot and cold water flowing through the valve but only controls the temperature. The mixing valve also includes one-way valves to prevent back flow of water through the valve in the event there is a reduced pressure experience within the water supply system.

Both cartridges 11 and 11' include fine mesh screens 55 at the hot and cold water inlet openings of the cartridge to screen out any coarse grains of sand that may be entrained in the water. It is also apparent that cartridges 11 and 11' are interchangeable and may be utilized in the same mixing valve housing when so desired. It is obvious that the present design permits the removal of cartridges 11 or 11' without the necessity to remove thermostat 5 from chamber 4.

Many modifications of design and use of different materials are contemplated without departing from the invention as claimed herein.

What is claimed is:

1. In a thermostatically controlled mixing valve, a cartridge adapted to be removably insertable into a valve body so as to provide either an individual or a central type thermostatically controlled mixing valve for use in sanitary installations, said valve comprising:

a valve body having an outlet opening, hot and cold water inlet openings, and having a first chamber in fluid communication with said outlet opening and a second chamber;

a temperature sensing and thermostat control assembly mounted in said first chamber;

said second chamber being selectively in fluid communication with said hot and cold water inlet openings, said second chamber being disposed normal to said first chamber so as to removably receive a cartridge in liquid tight engagement;

said cartridge comprising a volume control assembly which includes a rotatably mounted shaft extending along the axial length thereof, spaced hot and cold water valve means mounted on said shaft so that when said shaft is rotated to its on and off positions respectively, said hot and cold water valves open and close simultaneously;

a temperature control sleeve and collar assembly operatively coupled to and engaged with said temperature sensing and control assembly so that said temperature sensing and control assembly is independently operable with said volume control assembly;

said temperature sensing and control assembly having a U-shaped bimetallic element mounted in said first chamber; a first arm of said bimetallic element forming a stop for a first plunger; a second arm of said bimetallic element biasing against a shoulder on said temperature control sleeve;

a second plunger in said valve body which moves axially in response to a temperature setting of said temperature sensing and control assembly;

a second independent spring mounted in said valve body which is displaceable against the action of said first plunger to thereby cause said sleeve to shift to or away from the hot and cold water outlet openings of said cartridge in response to a temperature change in the water in said first chamber; and said cartridge assembly having its external dimensions identical to the space in said second chamber so as to be insertable alternately, into said second chamber of said valve body of either an individual or central type thermostatically controlled mixing valve.

* * * * *